United States Patent
Fornari et al.

(10) Patent No.: US 11,341,412 B1
(45) Date of Patent: May 24, 2022

(54) SYSTEMS AND METHODS FOR CONSTRUCTING MOTION MODELS BASED ON SENSOR DATA

(71) Applicant: BioMech Sensor, LLC, Midlothian, VA (US)

(72) Inventors: Frank Fornari, Midlothian, VA (US); Igor Peric, Barcelona (ES); Alexander Maslennikov, North Potomac, MD (US); Jeffrey Rowberg, Salem, VA (US); Dusko Mirkovic, Bijeljina (BA)

(73) Assignee: BioMech Sensor, LLC, Midlothian, VA (US)

( * ) Notice: Subject to any disclaimer, the term of this patent is extended or adjusted under 35 U.S.C. 154(b) by 0 days.

(21) Appl. No.: 17/365,935

(22) Filed: Jul. 1, 2021

(51) Int. Cl.
*G06K 9/00* (2022.01)
*G06N 3/08* (2006.01)
*G06N 3/04* (2006.01)
*G06K 9/62* (2022.01)
*G06F 3/01* (2006.01)

(52) U.S. Cl.
CPC ............. *G06N 3/08* (2013.01); *G06F 3/011* (2013.01); *G06F 3/017* (2013.01); *G06K 9/6261* (2013.01); *G06K 9/6263* (2013.01); *G06K 9/6268* (2013.01); *G06N 3/0454* (2013.01)

(58) Field of Classification Search
CPC ........................................................ G06F 3/017
See application file for complete search history.

(56) References Cited

U.S. PATENT DOCUMENTS

| | | | |
|---|---|---|---|
| 9,354,709 B1* | 5/2016 | Heller | G06F 3/017 |
| 2014/0378159 A1* | 12/2014 | Dolbakian | H04W 4/029 455/456.1 |
| 2016/0165140 A1* | 6/2016 | Mourikis | H04N 5/23258 348/208.2 |
| 2019/0154872 A1* | 5/2019 | Leduc | G06N 3/08 |
| 2019/0272477 A1* | 9/2019 | Ide | G06N 99/00 |
| 2020/0361083 A1* | 11/2020 | Mousavian | B25J 9/1612 |
| 2021/0254979 A1* | 8/2021 | Faragher | G01S 19/49 |

* cited by examiner

*Primary Examiner* — Hadi Akhavannik
(74) *Attorney, Agent, or Firm* — Finnegan, Henderson, Farabow, Garrett & Dunner LLP

(57) ABSTRACT

This disclosure relates to systems, media, and methods for updating motion models using sensor data. In an embodiment, the system may perform operations including receiving sensor data from at least one motion sensor; generating training data based on at least one annotation associated with the sensor data and at least one data manipulation; receiving at least one experiment parameter; performing a first experiment using the training data and the at least one experiment parameter to generate experiment results; and performing at least one of: update or validate a first motion model based on the experiment results.

19 Claims, 7 Drawing Sheets

SYSTEMS AND METHODS FOR CONSTRUCTING MOTION MODELS BASED ON SENSOR DATA

TECHNICAL FIELD

This disclosure relates generally to data acquisition and analysis, and more particularly to methods and systems for motion data quantification, acquisition, analysis, and feedback.

BACKGROUND

In current contexts, some systems may sense and analyze human motion, such as in the sports or medicine industries. For example, an application may analyze a video of a user's golf swing, or a wrist-worn fitness tracker may record a number of steps a user takes in a day. Existing motion analysis techniques include crude comparisons using video data or motion data, often with little to no user input. Many of these techniques lack the ability to consistently and accurately distinguish different types or portions of motion. In many cases, current systems lack helpful tools that allow analysts to fully understand motion data and manipulate data to improve future results and applications. The embodiments discussed herein address one or more of these and other problems in the art.

SUMMARY

Disclosed embodiments may include methods, systems, and non-transitory computer-readable media to update motion models using sensor data. Disclosed embodiments may include receiving sensor data from at least one motion sensor; generating training data based on at least one annotation associated with the sensor data and at least one data manipulation; receiving at least one experiment parameter; performing a first experiment using the training data and the at least one experiment parameter to generate experiment results; and performing at least one of: updating or validating a first motion model based on the experiment results.

In further embodiments, the at least one processor may be configured to execute the instructions to receive a motion classification from a user device; and generating the training data may be further based on the motion classification. The motion classification may identify an activity and the at least one annotation may indicate a favorable or unfavorable motion associated with the activity. The at least one processor may be configured to execute the instructions to select the at least one data manipulation based on the motion classification, and the motion classification may identify an activity associated with the sensor data.

In further embodiments, the at least one data manipulation may be selected based on the motion classification identifying an approximate time window associated with a type of motion associated with the activity. The at least one data manipulation may comprise: vertically scaling at least a portion of the sensor data; time scaling at least a portion of the sensor data; time shifting at least a portion of the sensor data; integrating white noise into at least a portion of the sensor data; applying random nonlinear skewing to at least a portion of the sensor data; or generating a plurality of data streams based on the sensor data, the data streams having differing smoothing intensities.

In further embodiments, the at least one processor may be configured to execute the instructions to: associate a first version identifier with the first motion model; perform a second experiment using the first motion model to generate a second motion model; and associate a second version identifier with the second motion model.

In further embodiments, the sensor data may be generated by an inertial measurement unit. The inertial measurement unit may be part of a wearable device.

In further embodiments, the at least one processor may be configured to execute the instructions to: prevent changes to an experiment dataset prior to performing the first experiment, the experiment dataset comprising at least the sensor data, the training data, and the at least one experiment parameter; and prevent changes to the experiment results.

In further embodiments, the first motion model may be configured to: identify a segment of sensor data as indicative of a motion type; and annotate the segment. The segment annotation may be viewable at a user device. The segment annotation may comprise an indication of favorability or non-favorability of the motion type. The first motion model may be further configured to generate a user interface comprising an indication of favorability or non-favorability of the motion type.

In further embodiments, the first motion model may represent a range of motion patterns and may be configured to generate an alert in response to sensor data representing a deviation from the range of motion patterns.

In further embodiments, performing the first experiment may comprise applying the first motion model to the training data; and updating or validating the first motion model may be based on at least one user input received from a management device. The experiment results may comprise a motion data pattern and at least one user-generated or model-generated annotation associated with the motion data pattern; and the at least one user input may comprise an instruction to perform at least one of: shifting the generated annotation; adding a new annotation to the experiment results; or deleting the generated annotation.

In further embodiments, generating the training data may comprise delineating horizon vectors associated with the sensor data based on the at least one annotation.

In further embodiments, the sensor data may comprise at least two motion data streams captured by the at least one motion sensor during different time periods.

In further embodiments, the first motion model may be at least one of a convolutional neural network or a recurrent neural network.

It is to be understood that both the foregoing general description and the following detailed description are exemplary and explanatory only and are not restrictive of the invention, as claimed. Additionally, the various disclosed embodiments may be used together.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
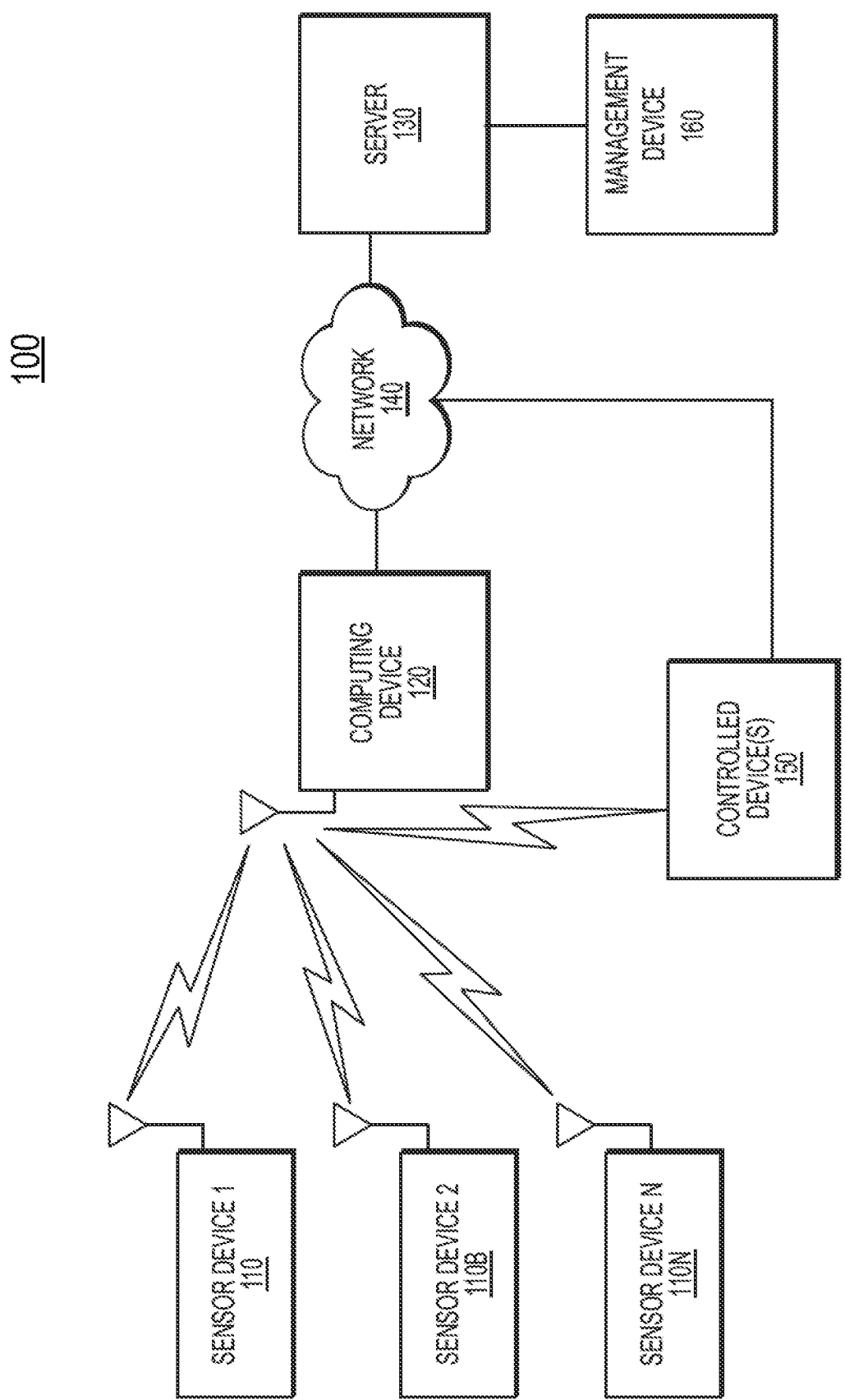
FIG. 1A illustrates an exemplary motion data acquisition, analysis, and feedback system according to some embodiments of the present disclosure.

FIG. 1 illustrates an exemplary real-time data quantification, acquisition, analysis, and system 100 according to some embodiments of the present disclosure. System 100 may include one or more sensor devices (110, 110B, 110N), computing device 120, controlled device(s) 150, network 140, and server 130.

System 100 may include one or more sensor devices to aggregate sensor data. Sensor devices 110, 110B, and 110N represent the one or more sensor devices that provide data to system 100. Each of the shown sensor devices may include the same sensor capabilities or different capabilities. For example, sensor device 110 may include an inertial measurement unit (IMU), while sensor device 110B provides pressure data (e.g., from the grip of a club or racket, or from an insole). In a differing example, the entire sensor shown could only include IMUs, but could be located on different people, or on different points of a single person (e.g., wrist, knee, or ankle). In some embodiments, a sensor device 110 may be wearable device (e.g., wearable on an individual). Sensors may provide various sensed data to system 100 as further discussed below.

System 100 may include computing device 120. In some embodiments, computing device 120 may be a general-purpose computer, tablet device, smartphone, or smart watch. Computing device 120 may include a processor, memory (e.g., random-access memory, called RAM, flash memory, and/or a hard disc), various wired and wireless interfaces (e.g., Bluetooth, IEEE 802.11, Ethernet, Universal Serial Bus (USB), USB-C, and/or proprietary ports such as Apple Lightning), input devices (e.g., touchscreen, keyboard, mouse), and a display. Computing device 120 may operate programmable instructions stored locally or remotely to perform disclosed processes.

Computing device 120 may interact with one or more sensor devices. Computing device 120 may receive sensor data from sensor device 110, sensor device 110B, and/or sensor device 110N. For example, sensor device 110 may send, in real-time, data perceived from sensors. Sensor data may be high-resolution data, and the connection between sensor device 110 and computing device 120 may be a high-bandwidth connection, such as a Bluetooth "classic" wireless connection. While such high-bandwidth wireless technologies may use more power than alternatives (e.g., Bluetooth "low energy"), the increased data resolution that may be used by system 100 may use higher bandwidth wireless interfaces. Computing device 120 may be associated with a particular user (e.g., a user device).

System 100 may include controlled device(s) 150 that perform functions based on received instructions. For example, controlled device(s) 150 may include output devices, such as remote displays, lights, speakers, and tactile engines that may provide feedback (e.g., information regarding one or more detected events) to a user of sensor device 110. These types of controlled devices may provide feedback (e.g., a status indicator) to a user based on sensor data, such as informing the user that a sensor device is providing a data profile that meets expectations (e.g., is within an expected envelope of a reference profile) by displaying a green light, playing a positive tone, or tapping the user via a worn tactile engine. Other devices, such as computing device 120, may also provide feedback. Other feedback may include providing to a user: a percent match between a provided data profile and a reference data profile (e.g., representing ideal motion), an alert when motion (or other attribute) deviates from a reference envelope, and/or text recommendations regarding the user's motion (e.g. "consider angling your wrist differently to stabilize your motion"). By way of example and not limitation, a data profile may be generated for an individual prior to a medical operation, which may be treated as a reference data to compare to motion (or other attribute) sensed from the individual after the medical operation. In some embodiments, feedback may be presented to an individual within a user interface. For example, a user interface may display an ideal "baseline" of sensor data (e.g., motion) and may display sensed data (e.g., motion of the individual) relative to the baseline, such as in a line graph, timeline, histogram, or other visual representation. Feedback may be related to a motion data profile and/or non-motion data profile (e.g., temperature data profile, respiration data profile, etc.). Similar feedback operations may also be performed by other devices (e.g., computing device 120).

In some embodiments, computing device 120 and/or sensor device 110 may issue a prompt to an individual related to a wearable device. For example, computing device 120 may prompt (e.g., on a display, audibly, etc.) for a user to confirm that a wearable device is connected to the user (e.g., "is the bracelet attached to your wrist?"), to activate power to a wearable device, to connect a wearable device (e.g., via Bluetooth® or other wireless communication protocol), etc. In some embodiments, a sensor device may not sense motion (or other attribute) if a user has not confirmed that the device is connected to an individual (or otherwise appropriately placed, such as within an area for sensing light).

In another example, controlled device(s) 150 may include devices that affect a user's workout environment. For example, controlled device(s) may include a fan, air conditioning system, or workout equipment. In this example, computing device 120 may transmit instructions to increase a fan speed, close shades to block sunlight, and/or instruct an air conditioner responsive to determining that the sensor device 110 indicates that a user's body temperature exceeds a healthy threshold level.

In still other examples, controlled device(s) 150 may include medical devices, such as insulin pumps, pacemakers, cardiac defibrillators, gastric stimulators, deep brain neurostimulators, and/or cochlear implants. In one example, computing device 120 may transmit a control signal to an insulin pump to vary insulin dosage based on data from sensor device 110 indicating higher levels of activity (e.g., a data profile matching an event model for intensifying activity). In another example, computing device 120 may transmit a control signal to a medication pump to provide medication to prevent or greatly lessen Parkinsonian tremors.

In still other examples, controlled device(s) 150 may include electrical and/or mechanical devices, such as parts of a vehicle (e.g., non-autonomous, partially autonomous, fully autonomous, etc.), assembly line, factory, a refrigerator, a freezer, lights, etc. In another example, computing device 120 may transmit a control signal to a piece of assembly line machinery to pause operation. In another example, computing device 120 may recalibrate and/or restart another device.

System 100 may include network 140. In some embodiments, network 140 may be a wired and/or wireless network. For example, network 140 may be any combination of a Local Area Network (LAN), Wide Area Network (WAN), wireless LAN (WLAN), and/or the Internet. System 100 may use network 140 to connect various devices. For example, computing device 120 may connect to server 130, controlled device(s) 150, and/or sensor device 110 using the network. Alternatively, as depicted, computing device 120 may interface directly with sensor device 110 and/or controlled device(s) 150. For example, computing device 120 may form its own wireless access point to connect to other devices.

System 100 may include server 130 to provide networked storage and analysis. Server 130 may be a networked computer. Server 130 may include a central processing unit, such as at least one data processor that executes program components for executing user- or system-generated requests. The processor may include specialized processing units or a general-purpose microprocessor.

Server 130 may facilitate network-based (e.g., "cloud") storage and data interaction. For example, computing device 120 may transmit data profiles and the underlying raw data to server 130 for storage. In an embodiment, server 130 may analyze data profiles over time and provide feedback based on changes. Server 130 may transmit notifications (e.g., send email, upload data, revise websites, update databases) based on analysis of data.

In some embodiments, server 130 may serve as a portal to allow users to interact with archived data profiles and raw data. For example, server 130 may provide a graphical user interface that presents data profiles organized by particular categories, dates, or types.

In some embodiments, system 100 may include a management device 160, which may be associated with managing generation, updating, and/or validation of motion models. In some embodiments, management device 160 may be a computing device having one or more components of server 130. For example, management device 160 may include a program 172 that produces one or more interfaces to display, and allow for user interaction with, data related to motion models (e.g., sensor data, model parameters, experiment parameters, etc.). By way of further example, management device 160 may receive data, manipulate data, model data, display data, or perform any step of the processes described herein. In some embodiments, a management device 160 and a controlled device 150 may be the same device.

Figure 1B:
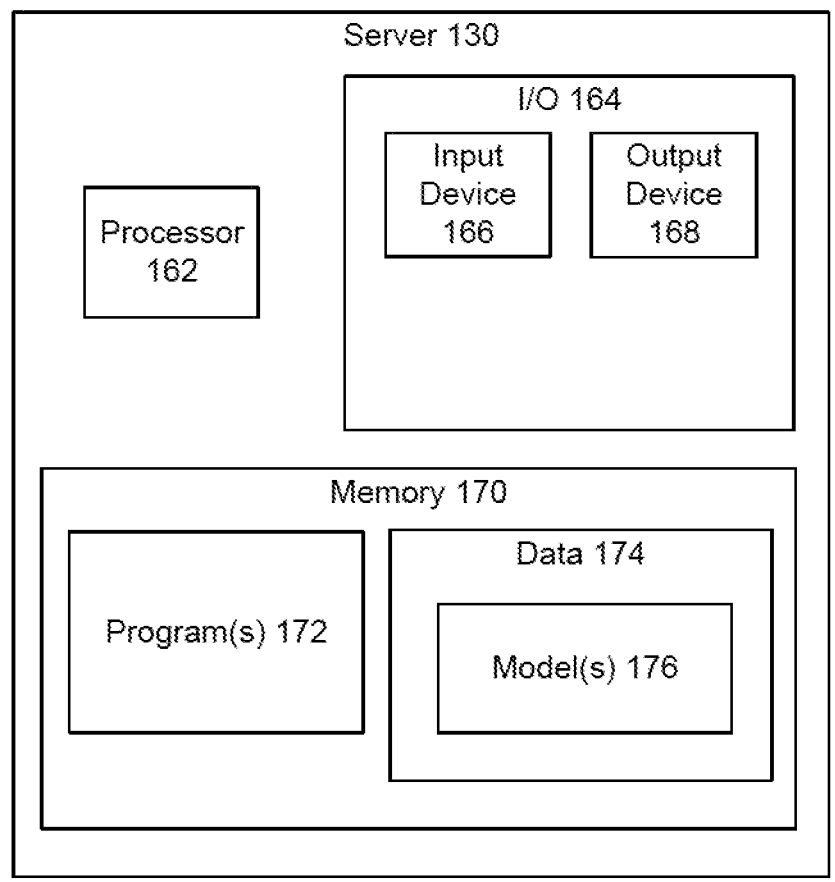
FIG. 1B is a functional block diagram of a server according to some embodiments of the present disclosure.

FIG. 1B is a functional block diagram of server 130 according to some embodiments of the present disclosure. While several components are discussed with respect to exemplary server 130, it is fully appreciated that sensor device 110, computing device 120, controlled device 150, management device 160, or any other device connected to system 100 may also include any or all of the components discussed with respect to server 130. For example, computing device 120 may include one or more models 176.

Server 130 may include a processor 162, which may be a single-core or multi-core processor. Processor 162 may also be a general-purpose processor, a specialized processor, programmable microcontroller, programmable processor (e.g., a complex programmable logic device (CPLD) or a field-programmable gate array (FPGA)), or an application-specific integrated circuit (ASIC). In some embodiments processor 162 may be a virtual processor and/or configured to spin up or spin down a number of virtual computing instances (e.g., containers, virtual machines) to perform one or more operations discussed herein. Processor 162 may be at least one data processor that executes program components for executing user-generated and/or system-generated requests. Processor 162 may include specialized processing units or a general-purpose microprocessor. Processor 162 may be configured to carry out all or part of process 500 and/or process 600.

Server 130 may also include input/output (I/O) 164, which may be an interface or grouping of one or more input devices 166 and one or more output device 168. Input device 166 may be configured to receive input from a user of server 130, and one or more components of server 130 may perform one or more functions in response to input received. In some embodiments, input device 166 may include a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver, an input device, an output device, or other input device to perform aspects of the disclosed embodiments. For example, input device 166 may include an interface displayed on a touchscreen (e.g., output device 168). Output device 168 may be configured to output information and/or data to the user. For example, output device 168 may include a display configured to display sensor or motion model data (e.g., a light-emitting diode (LED) display, a liquid crystal display (LCD) display, etc.).

Server 130 may also include a memory 170, which may store instructions for various components of server 130. For example, memory 170 may store instructions that, when executed by processor 162, may be configured to cause processor 162 to perform one or more functions described herein (e.g., steps of process 500 and/or process 600). Memory 170 may be a RAM memory component, flash memory, solid-state drive, hard disk, or other data storage medium. Memory 170 may store program(s) 172, which may be one or more programs, modules, applications, modules, or other computer code configured to carry out one or more operations described herein (e.g., steps of process 500 and/or process 600). For example, memory 170 may store a program 172 that may be configured to generate, train, update, and/or validate a model, consistent with disclosed embodiments. Memory 170 may also store data 174, which may include data received from a sensor device and/or data generated (e.g., by processor 162) in response to an input received at server 130. For example, data 174 may include sensor data, motion data, a user preference, a user input, a model parameter, an experiment parameter, a training parameter, contextual data, metadata, and/or model(s) 176.

Model(s) 176 may be one or more motion models, which may be trained or untrained. In some embodiments, a trained model may be trained through supervised training, unsupervised training, or a combination of both. A model may be a stochastic model or a deterministic model. In some embodiments, a trained model may be trained using input data, which may include sensor data (e.g., received from a sensor device 110) and/or user inputs (e.g., data annotations). In some embodiments, a model 176 may be a k-nearest neighbors (KNN) model, a recurrent neural network (RNN), a convolutional neural network (CNN), an autoencoder, and/or other machine learning model. In some embodiments, a model 176 may perform one-dimensional operations with regularization techniques, such as batch normalization and drop-out.

In some embodiments, a model 176 may be configured for (e.g., have particularized parameters for, such through training with particular types of input data) a type of motion, such as motion from a particular body part or combination of body parts (arm motion, leg motion, hand motion, foot motion, joint motion, compound motion, etc.), motion from a particular action (e.g., walking, swinging, physical therapy activity, etc.), motion for a particular individual (e.g., a child, an adult, a college athlete, a professional athlete), motion from a particular combination of sensors (e.g., sensors worn on multiple body parts, worn on multiple individuals, different types of sensors worn by the same individual, etc.), a favorable action (e.g., a motion indicating a favorable level of health, athletic quality, etc.), and/or an unfavorable action (e.g., a motion indicating an unfavorable level of health, athletic quality, etc.). For example, a motion model may represent a range of motion patterns (e.g., patterns of IMU data) and may configured to generate an alert in response to sensor data representing a deviation from the range of motion patterns (e.g., sensor data received from a mobile device). In some embodiments, a model 176 may be configured for a particular type of data that may not include motion data, such as temperature data, light data (for visible and/or invisible light), sound data, pressure data, magnetism data, humidity data, radiation data, heartbeat data, blood oxygen data, respiration data, brain wave data, etc. A model 176 may have been trained using data from a particular source (e.g., an individual, a location, a building, a company, a business, a hospital, a clinic, etc.) In some embodiments, a model 176 or other part of data 174 may include one or more sensor data profiles, which may represent expected or ideal data (e.g., an expected data stream from a sensor device). A sensor data profile may include a waveform, histogram, threshold value, matrix, vector, statistical value, the like, and/or any combination thereof. For example, a motion sensor data profile may include three-dimensional acceleration data, three-axis orientation data, three-axis angular velocity data, and/or three-axis gravitational information over time. A sensor data profile may include, and/or may be based on, historical data from one or more sensor devices. In some embodiments, a sensor data profile may be generated by a model. A sensor data profile may also be based on user input (e.g., data annotations), statistical techniques (e.g., a simple moving average, exponential smoothing, an autoregressive integration moving average, Croston method algorithm, etc.), random data, etc.

Figure 2:
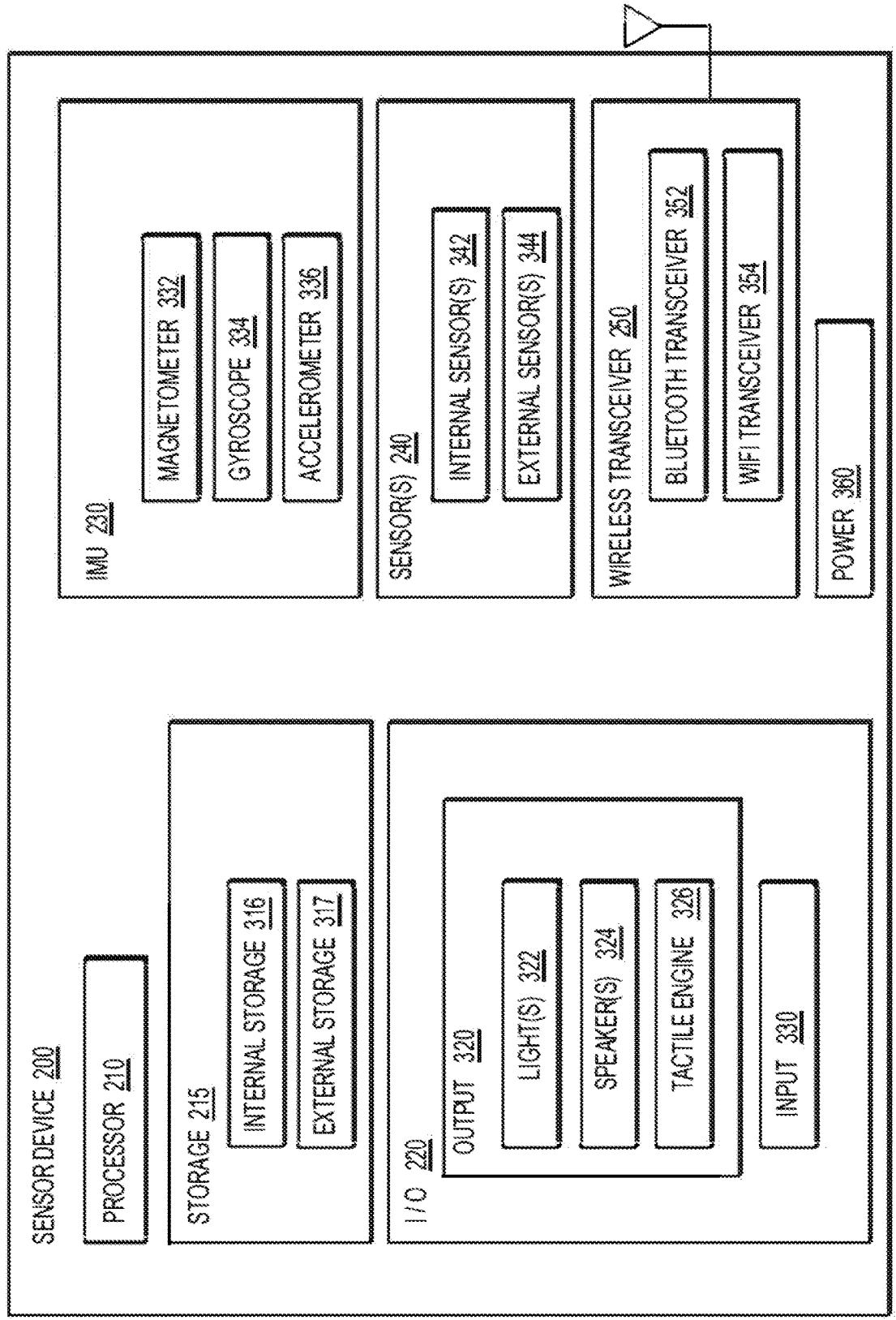
FIG. 2 is a functional block diagram of a sensor device according to some embodiments of the present disclosure.

FIG. 2 is a functional block diagram of sensor device 200 according to some embodiments of the present disclosure. Sensor device 200 may be an example of sensor device 110, consistent with disclosed embodiments. Sensor device 200 may include processor 210, storage 215, input-output 220, IMU (inertial measurement unit) 230, sensor(s) 240, wireless transceiver 250, and/or power 360.

In some embodiments, processor 210 may be a general-purpose processor, programmable microcontroller, programmable processor (e.g., an FPGA, a CPLD), or ASIC.

In some embodiments, storage 215 may include internal storage 316 and/or external storage 317. Internal storage 316 may include, for example, on-board memory, such as flash memory or RAM. External storage may include, for example, removable memory media, such as compact flash cards, secure digital cards, memory sticks, optical disks, and the like. In some embodiments, storage 215 may include non-transitory computer-readable media that stores instructions that, when executed by a process (e.g., processor 210), cause the processor to perform disclosed functions and processes.

Input-output 220 may include output 320 and input 330. In some embodiments, output 320 may include lights 322 (e.g., on or more LEDs, an LCD display, a laser, a projector), speaker(s) 324 (e.g., a piezoelectric speaker, a buzzer, a siren, a loudspeaker), and tactile engine 326 (e.g., vibrators, haptic feedback mechanisms). Lights 322 may include lights on various surfaces and different angles of sensor device 200.

Input 330 may allow a user to activate and interact with sensor device 200. In some embodiments, input 330 may include a physical input mechanism (e.g., button, switch, capacitive interface) or a way to receive input (e.g., an infrared receiver, an optical receiver, a USB or serial port). Physical input mechanisms, for example, may allow the user to turn sensor device 200 on and off, synchronize with a computing device, and/or change modes.

Figure 3B:
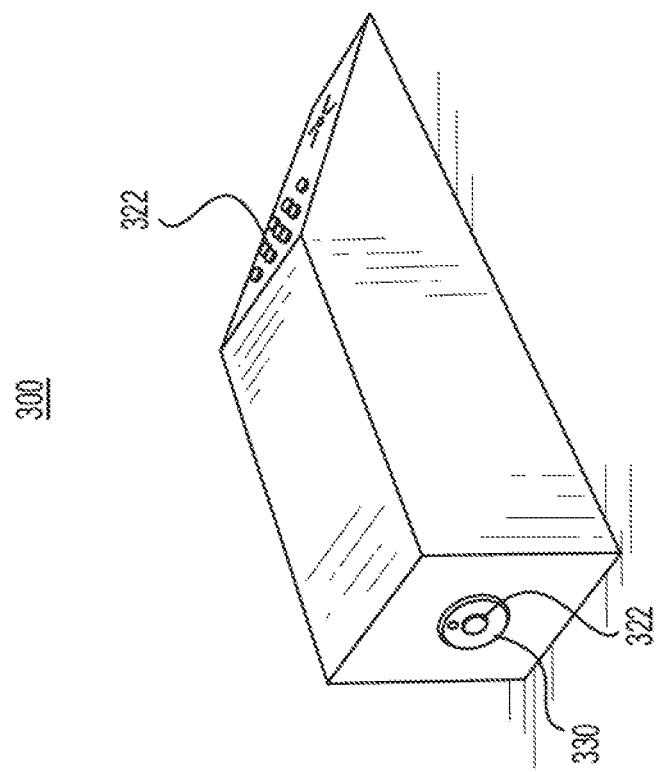
FIGS. 3A and 3B illustrate views of a sensor device in accordance with some embodiments of the present disclosure.
Figure 3A:
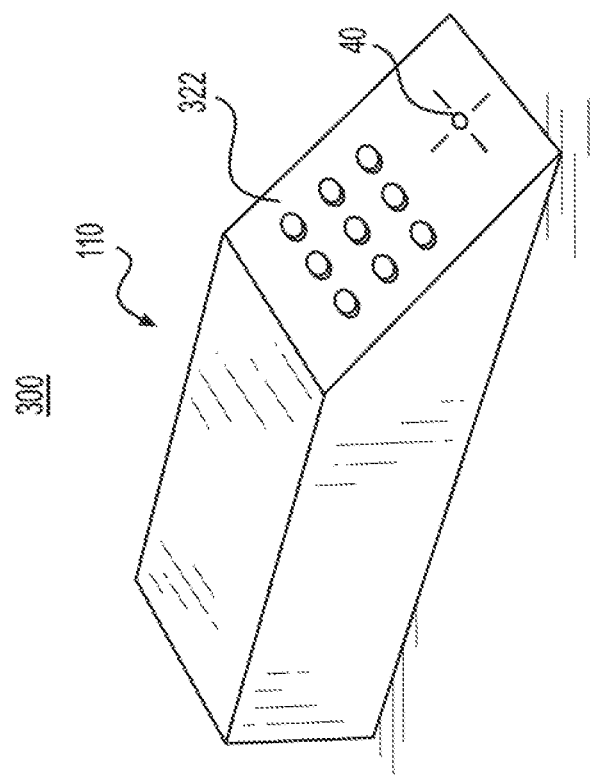

As an example of types of arrangements of output 320 and input 330, FIGS. 3A and 3B illustrate views of sensor device 300 (e.g., an exemplary sensor device 110 and/or sensor device 200) in accordance with some embodiments of the present disclosure. In some embodiments, sensor device 300 may include a combination of lights, such as an LED array. For example, as shown, sensor device 300 includes an angled face with a grid of lights 322 (e.g., LEDs). This grid may be programmed to display low resolution patterns or provide greater intensity light as a single unit. On another face, sensor device 300 may include a light combined with an input device (e.g., light(s) 322 combined with input 330 on the opposite face of sensor device 300). For example, input 330 may be a physical button that a user may press to interact with sensor device 300. Various depression patterns (e.g., long-press, double-press, triple-press, quick-press) may be used to indicate different input codes. For example, a user may long press the button to initiate pairing with a computing device 120. In another example, a user may tap a code corresponding to a tag that the user wishes to associate with a particular set of data collected. The user may, for example, triple tap input 330 before and/or after performing a motion to indicate that system 100 should flag the corresponding motion profile as an "ideal" or template motion, or a particular motion of interest for further analysis (e.g., bookmarking). While input 330 is shown as a single button, additional buttons (not shown) may be placed adjacent to input 330 or on different faces of sensor device 300. In addition to physical buttons, sensor device 300 may include receiver 40 to receive infrared or optical input, for example.

Returning to FIG. 2, in some embodiments, sensor device 200 may include IMU 230 to capture multi-dimensioned acceleration and orientation data. IMU 230 may include magnetometer 332, gyroscope 334, and/or accelerometer 336. In certain embodiments, processor 210 may sample IMU acceleration and orientation data at a rate of 100 samples per second. In some embodiments multiple IMU devices may be "stacked" and then time sliced to permit N Factor sample rate increases such that two such devices can generate 200 samples per second or even more.

In some embodiments, sensor device may include multiple instances of IMU 230 as a redundant measure to filter outlying measurements. For example, processor 210 may receive three-axis acceleration data from two or more IMUs. Processor 210 may average the acceleration data to increase accuracy, or when there are three or more IMUs, processor 210 may not make use of the highest and lowest readings, averaging the remaining readings to reduce measurement inaccuracies.

Sensor device 200 may also include various sensor(s) 240. In some embodiments, sensors may be embedded in sensor device 200 as internal sensor(s) 342. For example, a temperature sensor, light and/or light intensity sensor, humidity sensor, elevation sensor, voltage sensor, pressure sensor, laser sensor, and/or microphone may be housed within sensor device 200 and may interface directly with processor 210. In some embodiments, sensors may interface with sensor device 200 through a port or physical interface as external sensor(s) 344. For example, through a USB or serial connection, sensor device 200 may receive data from off-board sensors, such as biopotential telemetry measurement devices (e.g., electrocardiogram (ECG), electroencephalogram (EEG), electromyogram (EMG) data), optical input devices (e.g., cameras, rangefinders), and/or smartphone sensors (e.g., smartphone GPS, elevation, time, weather, sound, light). In some embodiments, external sensor(s) 344 may be used to verify data from internal sensor(s) 342. In some embodiments, sensor device 200 may be integrated into a larger device or system. For example, sensor device may be part of a machinery monitoring system, vehicle controller system, or any system capable of sensor integration.

Sensor device 200 may include wireless transceiver 250. Transceiver 250 may facilitate communication with computing device 120, network 140, and/or controlled device(s) 150. In some embodiments, transceiver 250 may include Bluetooth transceiver 352 and/or Wi-Fi transceiver 354. In an example, Bluetooth transceiver 352 may be a Bluetooth "classic" transceiver, rather than a Bluetooth "low energy" transceiver in order to provide increased bandwidth to transmit high resolution sensor data (e.g., to computing device 120) in real-time. In another example, Wi-Fi transceiver 354 may be an IEEE 802.11a/b/g/n/x transceiver. Additional wired and/or wireless standards may be used consistent with the bandwidth requirements of the disclosed systems and processes.

Sensor device 200 may include power 360 to provide electricity to components, such as processor 210 and storage 215, among other elements. In some embodiments, power 360 may include a direct current power source, such as a battery. For example, power 360 may include a lithium-ion polymer (LiPo) battery, nickel-metal hydride (NiMH) battery, and/or a nickel-cadmium battery. When power 360 includes a battery, power 360 may further include recharging circuitry, such as an electrical port, a removable battery, and/or inductive charging circuitry.

Figure 4:
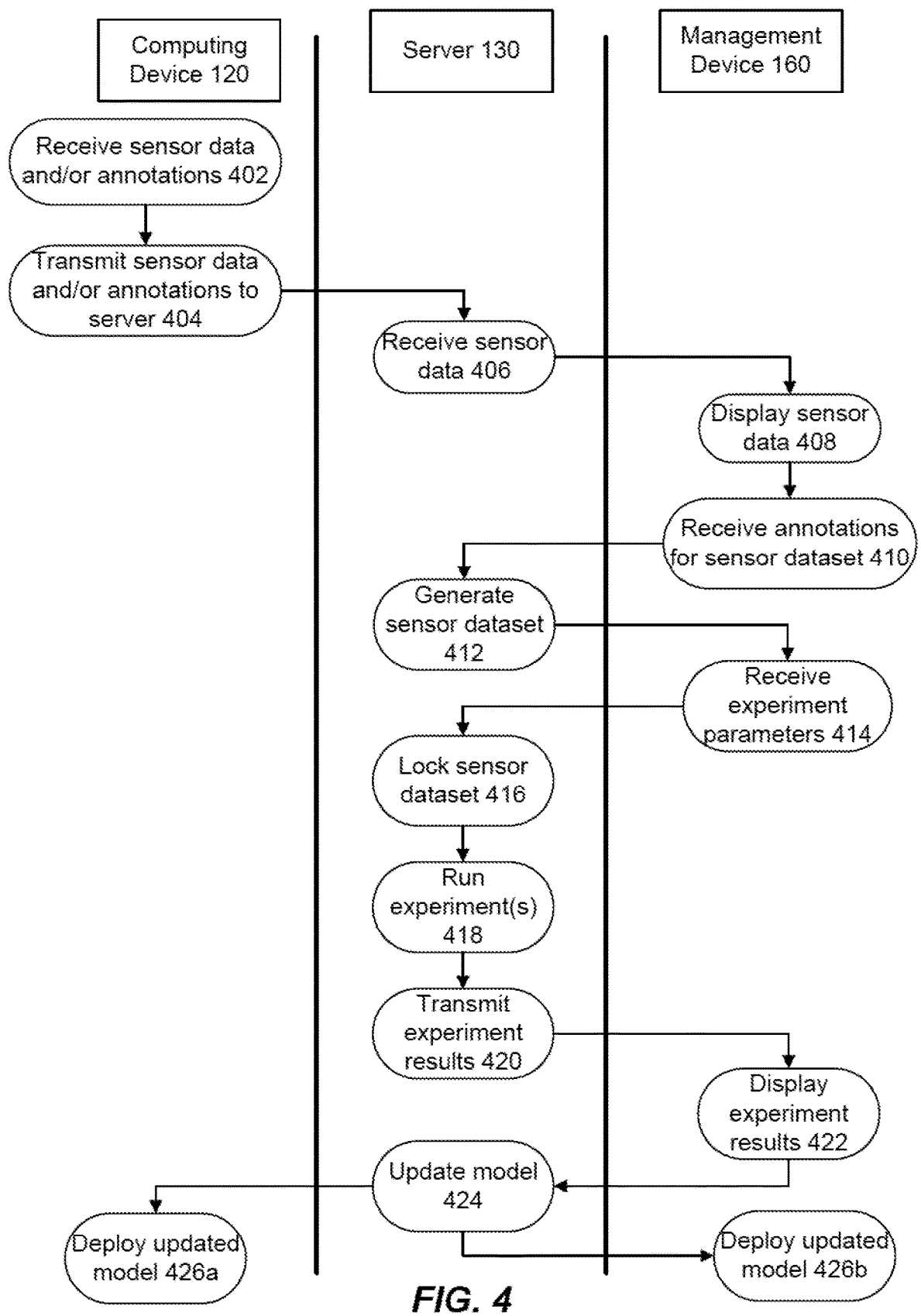
FIG. 4 is a flow diagram illustrating an exemplary data operation process in accordance with some embodiments of the present disclosure.

FIG. 4 is a flow diagram illustrating an exemplary data operation process in accordance with some embodiments of the present disclosure. Illustrative steps in the following discussion may be described with regard to the actions performed by a particular device, such as computing device 120, server 130, and/or management device 160. However, one or more alternative devices may instead perform the disclosed functions. For example, in an embodiment, a single device (e.g., server 130) may perform operations described with respect to server 130 and management device 160. Additionally, while the steps in FIG. 4 are shown in a particular order, the individual steps may be reordered, omitted, and/or repeated.

In some embodiments, at step 402, a computing device 120 may receive sensor data and/or annotations. For example, a user's smartphone may receive sensor readings from an IMU, which may be worn by the user. In some embodiments, computing device 120 may display sensor data in a line graph, histogram, time-series structure, or other data format. In some embodiments, a user may be able to interact with displayed data and/or data underlying displayed data. For example, computing device 120 may receive annotations from a user that indicate segments of a line graph associated with a particular type of motion. Sensor data, annotations, and other related aspects are discussed further with respect to process 500.

In some embodiments, at step 404, a computing device 120 may transmit sensor data and/or annotations to a server (e.g., server 130). For example, computing device 120 may transmit sensor data and annotations to a server in response to a user input. In some embodiments, computing device 120 may transmit data to server 130 based on received sensor data. For example, computing device 120 may transmit data to server 130 when it has not received sensor data for a threshold period of time, or when received sensor data indicates a lack of motion beyond a threshold.

In some embodiments, at step 406, a server 130 may receive sensor data and/or annotations. For example, server 130 may receive sensor data indicating IMU readings from user motion and/or annotation a user has made to sensor data. Receiving sensor data and/or annotations is discussed further with respect to process 500. In some embodiments, server 130 may store received data (e.g., locally, in a separate database, etc.).

In some embodiments, at step 408, a management device 160 may display sensor data. For example, management device 160 may display sensor data within one or more user interfaces, which may be part of an application at management device 160. For example, a user interface may include a line graph showing motion sensed by a sensor (e.g., IMU) over time. A user interface may also include an image and/or video associated with the captured motion. For example, a user interface may display a line graph of motion data adjacent to a video, and synchronize a point on the line graph with a corresponding frame of the video. In this manner, a user may be able to better understand how a physical visual motion is connected to underlying motion data, which may enable easier and/or more accurate data annotation.

In some embodiments, at step 410, a management device 160 may receive annotations for a sensor dataset (e.g., received sensor data). For example, management device 160 may receive an annotation on one or more points of a line graph of motion data over time (e.g., an IMU data reading over time). By way of further example, a management device 160 may receive from a user selections of two points on a line graph, as well as an indication that one point is associated with a starting point of a particular motion (e.g., a rolling motion of a user's step), and that another point is associated with an ending point of a particular motion. A management device may receive an input identifying a type of the particular motion and may associate the type of motion with the segment indicated by the two points on the line graph. Additionally or alternatively, a management device 160 may receive from a user a selection of a segment of a line graph and an indication of a particular motion associated with that segment (e.g., beginning of a swing of a baseball bat, contact being made with the bat and the ball). Annotations are discussed further below with respect to FIG. 5.

In some embodiments, at step 412, a server 130 may generate a sensor dataset. For example, server 130 may generate data that may be used for generating, training, or validating a model. The sensor dataset may be based on sensor data and/or annotations, and is discussed further with respect to FIG. 5. In some embodiments, at step 414, management device 160 may receive one or more experiment parameters, which may be set according to a user input and/or machine-generated at management device. Management device 160 may transmit the one or more experiment parameters to server 130, which may use the one or more experiment parameters in performing one or more experiments (e.g., machine-learning experiments). In some embodiments, at step 416, a server 130 may also lock a sensor dataset and/or at step 418, run one or more experiments, which may be based on experiment parameters set by a user, a machine, or a combination of both. Locking a sensor dataset, experiment parameters, and running one or more experiments are discussed further with respect to FIG. 5.

In some embodiments, at step 420, a server 130 may transmit experiment results. For example, server 130 may transmit experiment results to a management device 160, computing device 120, or other device. A device receiving the experiment results may provide them with options for a user to instruct additional operations, such as additional model training, removal of certain input data from model training, adjustment of an experiment parameter, adjustment of an annotation, etc. Other aspects of experiment results are discussed further with respect to FIG. 5.

In some embodiments, at step 422, a management device 160 may display experiment results. For example, management device 160 may display experiment results. As mentioned above, experiment results may be displayed with options for performing new or repeat steps related to motion data and/or motion models.

In some embodiments, at step 424, a server 130 may update a model. For example, server 130 may update a model that models one or more types of motion, consistent with disclosed embodiments. Aspects of updating models are discussed further with respect to FIG. 5.

In some embodiments, a computing device 120 and/or a management device 160 may deploy a model (e.g., an updated model). For example, at step 426a, a computing device 120 may deploy a motion model to provide a user with feedback. As another example, at step 426b, management device 160 may deploy a motion model (e.g., for further training or other refinement).

Figure 5:
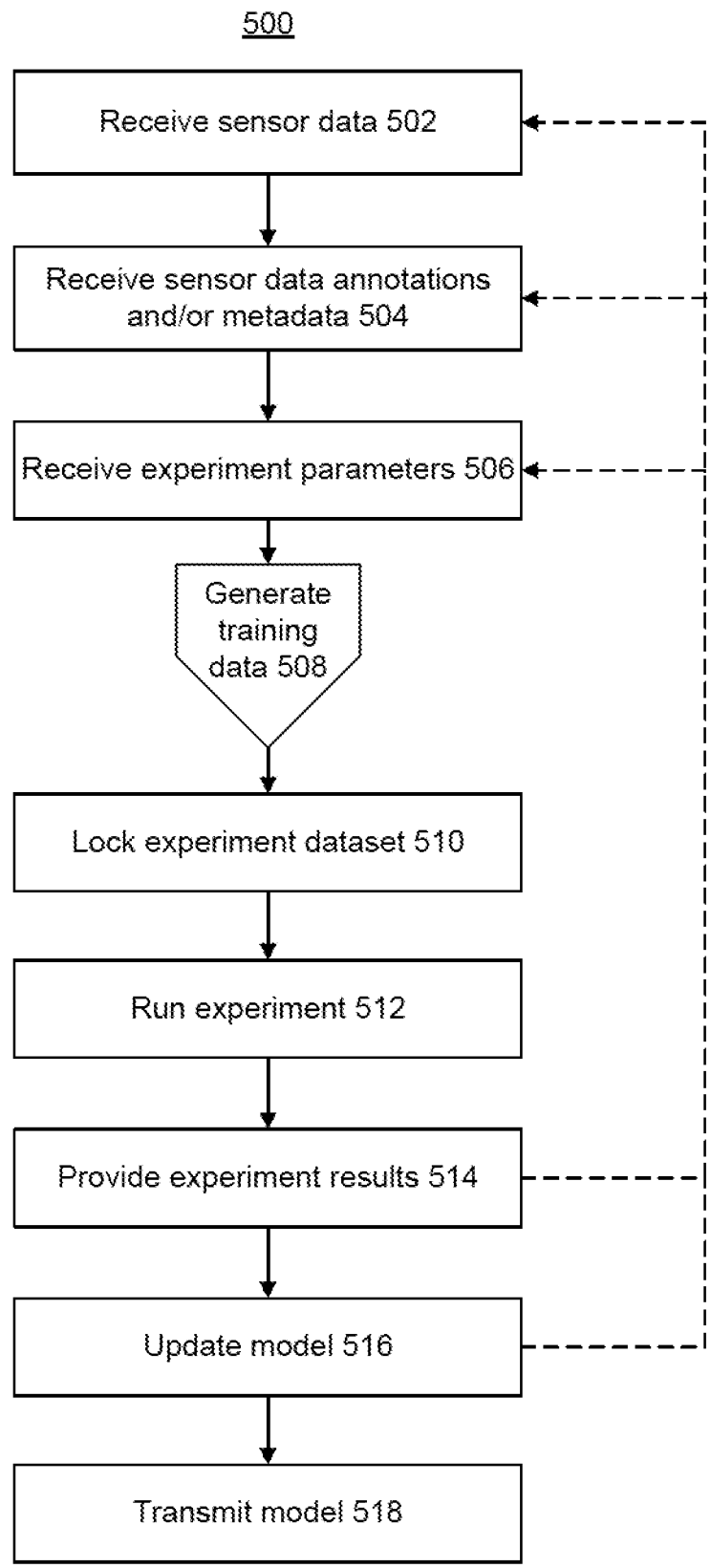
FIG. 5 is a flow diagram illustrating an exemplary data experiment process in accordance with some embodiments of the present disclosure.

FIG. 5 is a flow diagram illustrating an exemplary data experiment process in accordance with some embodiments of the present disclosure. Illustrative steps in the following discussion may be described with regard to the actions performed by a particular device, server 130. However, one or more alternative devices may instead perform the disclosed functions. For example, in an embodiment, a management device 160 or a computing device 120 may perform operations described with respect to FIG. 5. Additionally, while the steps in FIG. 5 are shown in a particular order, the individual steps may be reordered, omitted, and/or repeated.

At step 502, server 130 may receive sensor data, which may be received from at least one sensor (e.g., motion sensor). For example, sensor data may be generated by an inertial measurement unit (IMU) or other sensor device, which may collect data readings based on motion, and may transmit one or more of the data readings to server 130. In some embodiments, an IMU (e.g., IMU 230, or other sensor device) may be part of a wearable device, such as a fitness watch, anklet device, bracelet, or other device that can be worn by a person. In some embodiments, sensor data may be received from a plurality of sensor devices. In some embodiments, the sensor data may comprise at least two motion data streams captured by at least one motion sensor during different time periods. In some embodiments, the sensor data may comprise at least two motion data streams captured by a wearable device worn by a same person. The motion data streams may be associated with a same session. Sensor data may comprise at least two motion data streams captured for motion of two or more persons, either by a same wearable device or by different wearable devices. In some situations, sourcing sensor data from multiple sources (e.g., individuals, locations, buildings, entities, etc.) may allow for the creation of more robust models and/or sensor data profiles. Sensor data may also include data un-related to motion, such as light data, temperature data, sound data, or any other data sensed or recorded by a sensor device 110.

At step 504, server 130 may receive data annotations and/or metadata. A data annotation may include a marker, text, timestamp, or any other data element that emphasizes or otherwise provides contextual information for at least a portion of sensor data. In some embodiments, at least one annotation may indicate a favorable or unfavorable motion, which may be associated with an activity, consistent with disclosed embodiments. In some embodiments, an annotation may indicate a favorable or unfavorable operation (e.g., an annotation indicating a machine malfunction coinciding with a spike in a temperature reading). In some embodiments, an annotation may indicate whether an experiment (e.g., implemented by a model) correctly identified one or more events (e.g., motions of a particular type). For example, an annotation may indicate that a portion of sensor data marked by an experiment as being of a particular motion type is not of that type (e.g., is a false positive). As another example, an annotation may indicate a portion of sensor data unmarked by an experiment is of a particular motion type (e.g., is a false negative). Metadata may include a user identifier (e.g., identifying a person associated with generating motion represented by sensor data), an organization identifier, a software version identifier, a device identifier, a time, a date, a session identifier, a motion type identifier, an activity identifier, and/or any other contextual data.

In some embodiments, server 130 may receive a motion classification from a user device. A motion classification may identify an activity, such as a sporting activity (e.g. running, rowing, punching, etc.), type of exercise (e.g., a type of stretch, physical therapy exercise, etc.), frequent activity (e.g., walking, walking with assistance, grabbing, reaching, lifting, pulling, pushing, etc.), and/or any type of motion (e.g., as discussed above with respect to model 176). In some embodiments, a motion classification may identify an activity associated with sensor data, which may represent motion occurring when the activity was performed. In some embodiments, server 130 may receive a non-motion classification, such as a machine malfunction classification, a health condition classification (e.g., heartbeat data prior to cardiac arrest), or classification of any other data captured by a sensor device 110.

At step 506, server 130 may receive experiment parameters. An experiment parameter may include, without limitation, any or all of: a runtime of the experiment, a combination of data inputs for the experiment, a model weight, a threshold, or any constraint placed on generating a model or applying a model to sensor data (e.g., motion data). In some embodiments, server 130 may receive at least one experiment parameter that is set in response to a user input (e.g., at management device 160). In some embodiments, server 130 may produce an experiment dataset, which may include any data relevant for running an experiment. For example, the experiment dataset may include at least sensor data, training data, and/or at least one experiment parameter.

At step 508, server 130 may generate training data. In some embodiments, server 130 may generate training data based on at least one annotation associated with the sensor data (e.g., an annotation received at step 504) and/or at least one data manipulation. For example, an annotation may indicate a relatively short period of time associated with a motion (e.g., a short-impact motion), and server 130 may generate training data based on the relatively short period of time. As another example, server 130 may perform a stream-smoothing operation if an annotation indicates a relatively short period of time associated with a motion.

In some embodiments, generating the training data may be based on a motion classification or other classification (e.g., received at step 504). For example, server 130 may select at least one data manipulation based on a motion classification. In further embodiments, the at least one data manipulation may be selected based on a motion classification, which may identify an approximate time window associated with a type of motion associated with the activity. In some embodiments, generating training data may comprise delineating horizon vectors associated with the sensor data based on at least one annotation (e.g., as discussed further with respect to process 600). Additionally or alternatively, server 130 may generate training data and/or perform data manipulations according to process 600.

At step 510, server 130 may lock an experiment dataset, which server 130 may perform to prevent input data for an experiment from being changed during the experiment, which could interfere with experiment results or future model updates. For example, server 130 may prevent changes to an experiment dataset prior to performing a first experiment. Server 130 may prevent changes by suspending user interactability with an interface, running an uninterruptable experiment process (e.g., a system call or kernel function that cannot be interrupted by a signal), or performing another computing operation to freeze the experiment dataset.

At step 512, server 130 may run an experiment, which may be associated with generating, updating, and/or validating at least one model (e.g., a model 176). In some embodiments, server 130 may perform a first experiment using training data (e.g., generated at step 506) and at least one experiment parameter to generate experiment results. For example, performing a first experiment may include applying a first motion model to training data. In some embodiments, server 130 may select an already existing model as an initial model for the experiment. The selection of the initial model may be based on sensor data, a type of motion, a data annotation, and/or a metadata element. In some embodiments, running an experiment may include initializing a model with one or more combinations of input data (e.g., training data, sensor data, manipulated sensor data, annotations, etc.) to produce one or more model outputs (e.g., motions classifications, machine-generated annotations, motion predictions, etc.). For example, a model may be configured to identify a segment of sensor data as indicative of a motion type and annotate the segment (e.g., with an annotation identifying the motion type). In some embodiments, server 130 may run multiple experiments using different input data (e.g., training data) and/or experiment parameters. For example, in some embodiments, server 130 may perform a second experiment using a first motion model (e.g., based on an earlier experiment) to generate a second motion model. In some embodiments, a model may be trained and/or updated to ignore motion that does not reach a threshold (e.g., a threshold IMU data value representing an amount of movement, speed, acceleration, etc.). A threshold may be influenced by a user, a machine (e.g., updated according to a machine learning model), or a combination of both.

At step 514, server 130 may provide experiment results. For example, server 130 may transmit and/or permit access to experiment results, which may be stored locally at server 130 and/or a database accessible to server 130. Experiment results may be provided to a computing device 120 and/or management device 160, such as in one or more user interfaces. In some embodiments, experiment results may include a graph, a chart, a statistic, an experiment parameter, a model parameter, a favorability indicator (e.g., a motion favorability indicator, a health attribute favorability indicator, a device or system performance indicator, etc.), a label, and/or any visual indicating information relating to sensor data or/and a data model. A statistic may relate to motion data, and may include one or more of: a number of detected motions, a number of detected motions of a particular type (e.g., a motion unsafe for a vehicle driver), an average amount of time between motions, a median horizon vector length, a motion magnitude, etc. Additionally or alternatively, a statistic may relate to data the includes one or more of: a number of detected health events (e.g., a breathing irregularity, a heart tremor, a seizure, etc.), a number of detected health events of a particular type, an average amount of time between health events, a magnitude of a health event, a number of detected errors (e.g., a device error, system error, human error, etc.), a number of errors of a particular type an average amount of time between errors, an error magnitude, a risk value (e.g., risk of a potential future event or condition based on an application of a model to sensor data), etc.

In some embodiments, experiment results may include information related to information logged during an experiment and/or data aggregated across one or more experiments. For example, experiment can return a model and/or one or more metadata files a model was applied to in one or more sessions, which may indicate the result of running a trained detector on that session. In some embodiments, a metadata file may contain a list of detections (e.g., including a marked start point, end point, annotation) to indicate where in the data stream an event occurred. In some embodiments, experiment results may include an accuracy value, which may indicate a number of correctly and/or incorrectly identified events and/or non-events. For example, after receiving initial experiment results, a user may classify portions of sensor data as correctly and/or incorrectly identified events and/or non-events. These user classifications may be added to the experiment results.

In some embodiments, experiment results may include one or more model outputs. For example, a model may output a segment annotation, which may be viewable at a user device. In some embodiments, a segment annotation may comprise an indication of favorability or non-favorability of a motion and/or motion type. In some embodiments, the experiment results may comprise a sensor data profile.

For example, the experiment results may comprise a motion data pattern and/or at least one user-generated or model-generated annotation associated with the motion data pattern. A motion data pattern may be a sequence of sensor data readings, or other information, which may be associated with a particular motion (e.g., an unbalanced stepping motion).

In some embodiments, server 130 may prevent changes to the experiment results, which may use the same or similar techniques described above with respect to preventing changes to experiment datasets. This may ensure that an unalterable training record is preserved, allowing a machine learning model to appreciate past experiment datasets and results, so as to not repeat changes to a model that produce less accurate results.

At step 516, server 130 may update a model, which may be a motion model. In some embodiments, a motion model may be at least one of a convolutional neural network or a recurrent neural network (or any other model discussed herein). For example, a motion model may be updated based on at least a portion of experiment results. In some embodiments, updating or validating a motion model may be based on at least one user input received from a management device. For example, a user input may direct server 130 to change some model parameters but to not change other model parameters. Additionally or alternatively, the at least one user input may comprise an instruction to perform at least one of: shifting a generated annotation (e.g., generated and/or placed by a motion model), adding a new annotation to the experiment results, altering an annotation (e.g., changing a segment of motion data that is associated with an annotation, such as by changing an endpoint of the segment), or deleting a generated annotation.

In some embodiments, server 130 may associate a first version identifier with the first motion model (e.g., as a form of "versioning"). Server 130 may also associate multiple version identifiers with multiple models. For example, server 130 may associate a second version identifier with a second motion model (e.g., a model generated or updated subsequently to, or based on, an earlier model). This may allow a user and/or a machine to track changes to a motion model over time, and learn from changes made and results generated.

In some embodiments, either additionally or alternatively to updating a model, server 130 may generate and/or validate a model. For example, server 130 may update a model and then validate the model. Server 130 may update, validate, and/or generate a first motion model based on experiment results. In some embodiments, server may validate a model by applying a validation dataset to the model (e.g., as input data) and determining whether the model produces expected model output (e.g., annotations on a dataset, identification of a type of motion, identification of a correct length in time of motion, etc.). A validation dataset may or may not include at least one data annotation.

As shown in FIG. 5, process 500 may involve aspects of recursion. For example, after steps 514 or 516 are performed, process 500 may return to steps 502, 504, and/or 508 (as shown by the dashed lines in FIG. 5). In this manner, process 500 may allow for the event annotations, followed by the training of a model (e.g., an event detector). The model may be applied to an entire data stream (or a portion of a data stream), false positive event detections may be removed (e.g., through user interaction), and remaining detections may be converted into markers (e.g., validated annotations). These aspects can be repeated for improving model training and event detection (e.g., until all desired event detections are captured). Of course, these recursions are merely exemplary, as any step in process 500 may be repeated and/or performed after or before any other step. stream.

At step 518, server 130 may transmit a model, which may be a motion model updated, validated, and/or generated at step 516. In some embodiments, transmitting a model may include storing a model in a model storage device (e.g., data 174, a database separate from server 130, locally at server 130, etc.). In some embodiments, server 130 may transmit and/or permit access to a model. For example, server 130 may permit a management device 160 to access a model (e.g., through a web portal, website, application, etc.), such as to apply the model to new sensor data received by the management device 160 (e.g., from a computing device 120, sensor device 110, etc.). Additionally or alternatively, transmitting a model may include deploying a model to a computing device. For example, server 130 may transmit an updated motion to a computing device 120 so that the computing device can apply the updated model to sensed motions and/or other types of attributes (temperature, sound, blood oxygen level, pulse rate, light, etc.), which may be represented by data readings from a sensor device. For example, a computing device 120, or other device, may provide feedback (e.g., as discussed above) to a user or other device, based on applying the updated model to sensed information, such as real-time sensed motions or attributes (discussed further above). Feedback may be provided based on real-time data streams and/or recorded data streams.

In some embodiments, such as embodiments where a computing device may lack superior computational resources to operate certain types of models, a less-computationally intensive version of a model may be deployed to a computing device. For example, a rule set that approximates a motion model may be deployed to a computing device, which may allow a computing device to benefit from improvements made to a motion model (e.g., through experiments), but without straining the computational resources of the computing device. For example, a "light" model may use a limited number and/or limited types of data augmentations (e.g., manipulations), such as experiment parameters. In some embodiments, differently configured models may be deployed to different types of computing devices (e.g., smartphones with vary processing capabilities). In some embodiments, a model may clone a data sample (e.g., an annotated event) a number of times that is proportional to a total number of data augmentations applied. In some embodiments, multiple models, which may have any level of computational complexity, may be deployed to a single device. Multiple models may be associated with a same type of sensor data (e.g., a same type of motion) or different types of sensor data. In some embodiments, multiple models may be applied sequentially or in parallel to sensor datasets.

Figure 6:
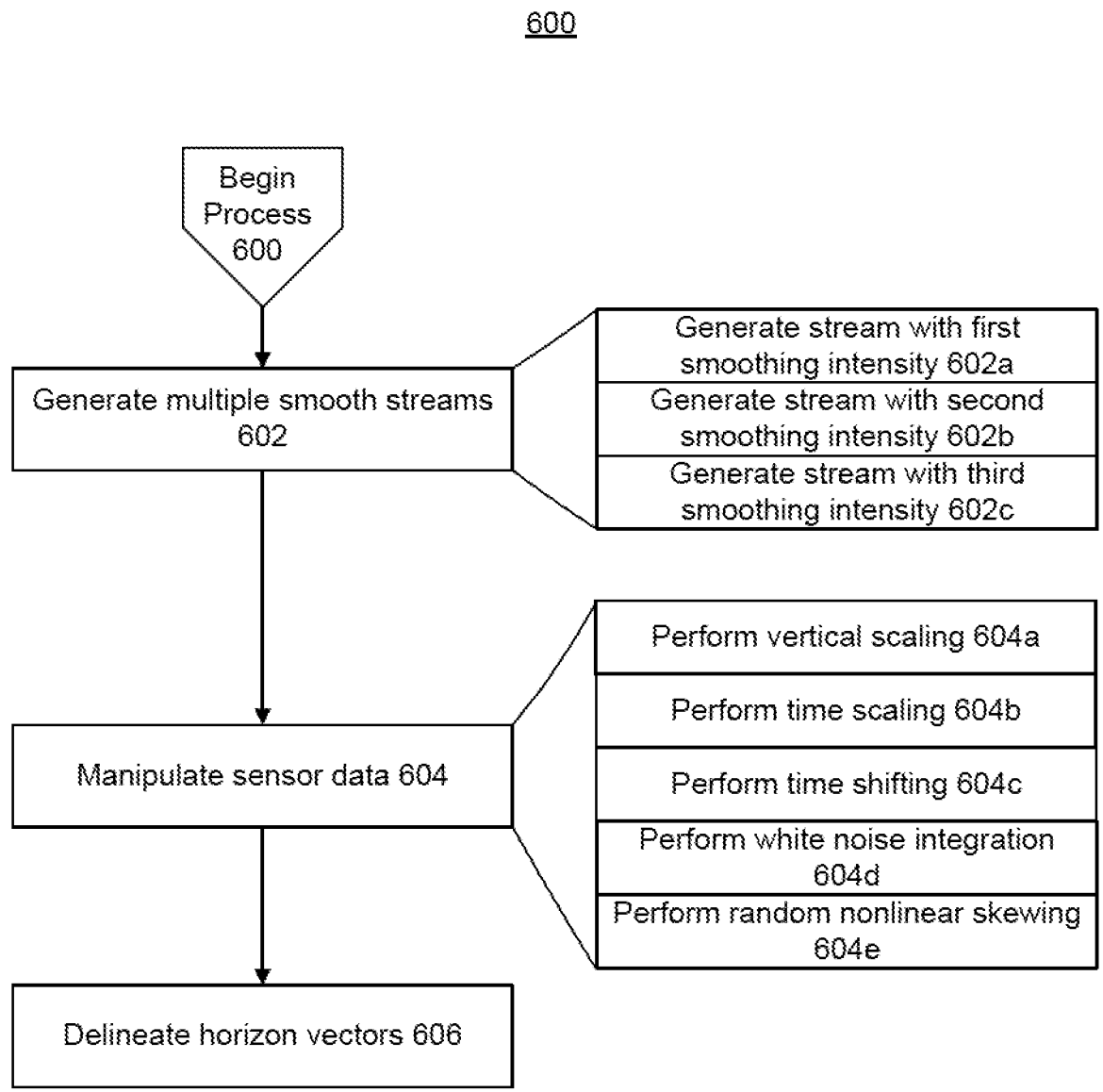
FIG. 6 is a flow diagram illustrating an exemplary training data process in accordance with some embodiments of the present disclosure.

FIG. 6 a flow diagram illustrating an exemplary training data process in accordance with some embodiments of the present disclosure. Illustrative steps in the following discussion may be described with regard to the actions performed by a particular device, server 130. However, one or more alternative devices may instead perform the disclosed functions. For example, in an embodiment, a management device 160 or a computing device 120 may perform operations described with respect to FIG. 6. Additionally, while the steps in FIG. 6 are shown in a particular order, the individual steps may be reordered, omitted, and/or repeated. The notation of "Begin Process 600" is intended to indicate that process 600 may begin as part of step 506 in process 500.

Process 600 may occur, in whole or in part, as part of any step in process 500, or not as part of process 500. In some embodiments, particular aspects of process 600 may be performed depending on a nature of sensor data, as discussed below.

In some embodiments, process 600 may include retrieving data for one or more selected sessions from a database (or other storage device), such that the data is local to a training machine (e.g., server 130). In some embodiments, a server 130 or other device performing at least a portion of process 600 may determine that it already the data stored locally and may not retrieve it from a database. In some embodiments, process 600 may include reshaping or otherwise reformatting sensor data into a shape or format interpretable by an application, program, and/or machine learning model (e.g., neural network performing process 500 and/or 600).

At step 602, server 130 may generate multiple smooth streams. In some embodiments, server 130 may generate a plurality of data streams based on sensor data, which may be smooth streams (e.g., streams where abrupt changes in data values past a threshold are smoothed). A smooth stream may be an altered version of a data stream recorded by a sensor device (e.g., a stream of IMU data from user motion) or an altered version of a manipulated data stream (e.g., manipulated according to step 604). In some embodiments the data streams may have differing smoothing intensities. For example, at sub-step 602a, server 130 may generate a stream with a first smoothing intensity (e.g., low intensity). Additionally or alternatively, at sub-step 602b, server 130 may generate a stream with a second smoothing intensity (e.g., medium intensity). Additionally or alternatively, at sub-step 602c, server 130 may generate a stream with a third smoothing intensity (e.g., high intensity). Generating smooth streams, which may be used for performing an experiment, may help a model to not make a false prediction or interpretation (e.g., of sensor data) based on a discontinuity in data. In some embodiments, server 130 may or may not apply normalization (e.g., at step 602, or another step of process 500 or 600). In some embodiments, certain amounts of smoothing or certain numbers of smooth streams may improve experiment results, and may be automatically applied by server 130. For example, generating a smooth stream may be useful for observing a trend over time, such as analyzing a person's gait, and server 130 may automatically perform smooth stream generation in scenarios where sensor data is received with certain metadata, such as a "gait" tag. As another example, server 130 may not implement high intensity smoothing in scenarios where a short-impact event is being analyzed and/or modeled, such as a swinging motion of a baseball bat.

At step 604, server 130 may manipulate sensor data. Manipulating sensor data may include changing sensor data received from a sensor and/or computing device, and may be done to refine sensor data prior to using the sensor data in one or more experiments. A manipulation may be application to a data stream recorded by a sensor device (e.g., a stream of IMU data from user motion) and/or a smooth stream (e.g., generated according to step 602). System 100 may select a particular combination of manipulation techniques based on the type or nature of the underlying data or application. Certain types of manipulation techniques may be more or less suitable for different applications as described below. System 100 may determine which techniques to use based on user input, data identifiers, a look-up table, and/or an automatic identification. In some embodiments, such as for automatic identification implementation, the system may recognize the location of the sensor on the user and identify a corresponding motion or a set of potential motions. The system may then identify the appropriate types of data manipulation based on the corresponding potential motion(s). For example, the system may recognize, based on the ratio of angular acceleration data across three axes, that the user is wearing a sensor on his or her chest. The system may then determine that the sensor location of the chest corresponds to certain tests, such as a sit-to-stand test, gait analysis, and/or balance test, for example. The table below includes some example sensor locations system 100 may identify and the corresponding types of motions and/or tests system 100 may determine in response. Additional combinations of location and motions/tests may be employed.

| Example Sensor Location | Example Type(s) of Motions/Tests |
|---|---|
| Wrist | Sports Swing Analysis |
|  | Range of Motion Test |
| Knee | Rangeof Motion Test |
|  | Joint Analysis |
| Forehead | Sit-to-Stand Test |
|  | Gait Analysis |
|  | Balance Test |
|  | Object Lifting Test |
| Chest | Sit-to-Stand Test |
|  | Gait Analysis |
|  | Balance Test |
|  | Object Lifting Test |
| Lower Back | Sit-to-Stand Test |
|  | Gait Analysis |
|  | Balance Test |
|  | Object Lifting Test |
|  | Neutral Spine Test |
|  | Jump Test (e.g., basketball jump) |
|  | Sports Swing Analysis (e.g. golf putt) |
| Object | Object Orientation Test |
|  | (e.g., archery bow holding test) |
|  | Object Position Test |
|  | Object Speed Test |
|  | Object Motion Test |

At sub-step 604a, server 130 may vertically scale at least a portion of the sensor data. Vertical scaling may include changing amplitude values of sensor data and/or interpolating data between sensor data values. In some embodiments, vertical scaling may be advantageous in situations where a trend within a data stream is more important to analyze than magnitudes of the trend. For example, in situations where a golf swing motion is analyzed (e.g., as determined through metadata), a person's form of the golf swing may be more important than its force, and server 130 may automatically apply vertical scaling. As another example, server 130 may determine that received sensor data contains long-impact motion (e.g., no or few spikes in motion), and may automatically apply vertical scaling.

At sub-step 604b, server 130 may time scale at least a portion of the sensor data. Time scaling may include changing time values associated with points of sensor data, such as to stretch or compress an amount of time associated with a portion of sensor data. Time scaling may also include interpolating data between sensor data values. In some embodiments, time scaling may be implemented in situations where a speed of motion is less important. For example, when performing experiments on motion data from a slow walking person's gait, speed of motion may not be as important, and server 130 may apply more time-scaling.

At sub-step 604c, server 130 may time shift at least a portion of the sensor data. Time shifting may include shifting a portion of sensor data associated with a first time period to a portion of a data stream associated with a second time period. In some embodiments, server 130 may determine that applying time shifting is appropriate and apply it automatically. For example, sensor data representing motion of a person attempting a new physical therapy exercise may include instances where the person pauses in mid-motion, and server 130 may shift some of the data in order to reduce or eliminate the lack of motion data corresponding to when the motion was paused.

At sub-step 604*d*, server 130 may integrate white noise into at least a portion of the sensor data. White noise may be generated using a component configured to detect white noise, or according to a white noise data template. In some embodiments, white noise may provide benefits in situations where a network or device generates high amounts of noise when sensing and/or transmitting data. For example, server 130 may analyze sensor data and determine that the motion data includes elevated amounts of distortion, and may apply a white noise filter and/or integrate white noise into sensor data, such as to allow for more precise training and/or experiment results.

At sub-step 604*e*, server 130 may apply random nonlinear skewing to at least a portion of the sensor data. Applying random nonlinear skewing may include changing sensor data values during a segment of time in a random or semi-random nonlinear fashion (e.g., altering amplitude values by different amounts). For example, applying random nonlinear skewing may include multiplying a portion of data with a Gaussian expression, which may be performed such that the peak of the Gaussian is multiplied at or near (e.g., within a number of milliseconds, seconds, etc.) an event and causes amplification of at least one non-event near the event. In some embodiments, manipulating sensor data may include applying other statistical filtering operations to sensor data. In some embodiments, nonlinear skewing may be used in situations where human-placed annotations lack reliability. For example, nonlinear skewing may be applied when motion data is received from a new user (e.g., as server 130 may determine through a user identifier and a history of received data), who may be unfamiliar with an application for placing annotations. As another example, motion data related to short impact motions may be more difficult for a user to annotate, and server 130 may apply nonlinear skewing automatically.

Of course, the parameter manipulations described with respect to FIG. 6 are merely exemplary, and sensor data may be manipulated according to other aspects, such as batch size (e.g., of data for an experiment), a number of epochs, a set of labels used for training (e.g., a number labels and their corresponding content or meaning), and/or a distance between automatically generated "no event" labels. These parameters, as well as those described above, may affect the success of an experiment. Thus, in some embodiments, an experimenter, a machine, or a combination of both, may define a range/set of parameter values over which a device (e.g., server 130) should iterate and train independent detectors (e.g., event detection models) using all or some combinations of the provided value ranges. In some embodiments, an experimenter, a machine, or a combination of both, can choose the best set of parameters comparing validation results of all of the experiments.

At step 606, server 130 may delineate horizon vectors. A horizon vector may be a vector that represents a time horizon for a motion (e.g., an amount of time associated with a type of motion) that is modeled by a motion model, demonstrated by actual sensor data, or a combination of both. In some embodiments, server 130 may delineate horizon vectors of manipulated sensor data (e.g., preserving user-made annotations of horizon vectors, altering annotations of horizon vectors based on a data manipulation, etc.). In some embodiments, at step 606 or other step discussed herein, server 130 may segment linear or serial data (e.g., time series sensor data) into data samples ready for training. As mentioned herein, sensor data altered according to process 600 may be used for running an experiment or other aspect described with respect to FIG. 5.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

For example, while some embodiments are discussed in a context involving human motion, the techniques described herein may also be applied to animal motion, machine motion, or motion performed by other actors. Moreover, while contexts relating to individual health or fitness are mentioned, the techniques described herein may also be applied to contexts involving individual productivity (e.g., monitoring motions of a factory line worker, a motion of a mover lifting boxes, etc.), individual driving habits, or any context of analyzing motion based on sensor data.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented system for updating motion models using sensor data, the system comprising:
    a memory storing instructions; and
    at least one processor configured to execute the instructions to:
        receive sensor data from at least one motion sensor;
        generate training data based on at least one annotation associated with the sensor data and at least one data manipulation, the at least one data manipulation including at least one of:
            vertically scaling at least a portion of the sensor data;
            time scaling at least a portion of the sensor data;
            time shifting at least a portion of the sensor data;
            integrating white noise into at least a portion of the sensor data;
            applying random nonlinear skewing to at least a portion of the sensor data; or
            generating a plurality of data streams based on the sensor data, the data streams having differing smoothing intensities;
        receive at least one experiment parameter;
        perform a first experiment using the training data and the at least one experiment parameter to generate experiment results; and
        perform at least one of: updating or validating a first motion model based on the experiment results.

2. The computer-implemented system of claim 1, wherein:
    the at least one processor is configured to execute the instructions to receive a motion classification from a user device; and generating the training data is further based on the motion classification.

3. The computer-implemented system of claim 2, wherein the motion classification identifies an activity and the at least one annotation indicates a favorable or unfavorable motion associated with the activity.

4. The computer implemented system of claim 2, wherein the at least one processor is configured to execute the instructions to select the at least one data manipulation based on the motion classification, the motion classification identifying an activity associated with the sensor data.

5. The computer implemented system of claim 4, the at least one data manipulation is selected based on the motion classification identifying an approximate time window associated with a type of motion associated with the activity.

6. A computer-implemented system for updating motion models using sensor data, the system comprising:
   a memory storing instructions; and
   at least one processor configured to execute the instructions to:
      receive sensor data from at least one motion sensor;
      generate training data based on at least one annotation associated with the sensor data and at least one data manipulation;
      receive at least one experiment parameter;
      perform a first experiment using the training data and the at least one experiment parameter to generate experiment results;
      perform at least one of: updating or validating a first motion model based on the experiment results;
      associate a first version identifier with the first motion model;
      perform a second experiment using the first motion model to generate a second motion model; and
      associate a second version identifier with the second motion model.

7. The computer-implemented system of claim 1, wherein the sensor data is generated by an inertial measurement unit.

8. The computer-implemented system of claim 7, wherein the inertial measurement unit is part of a wearable device.

9. The computer-implemented system of claim 1, wherein the at least one processor is configured to execute the instructions to:
   prevent changes to an experiment dataset prior to performing the first experiment, the experiment dataset comprising at least the sensor data, the training data, and the at least one experiment parameter; and
   prevent changes to the experiment results.

10. The computer-implemented system of claim 1, wherein the first motion model is configured to:
    identify a segment of sensor data as indicative of a motion type; and
    annotate the segment, the segment annotation being viewable at a user device.

11. The computer-implemented system of claim 10, wherein:
    the segment annotation comprises an indication of favorability or nonfavorability of the motion type; or
    the first motion model is further configured to generate a user interface comprising an indication of favorability or non-favorability of the motion type.

12. The computer-implemented system of claim 1, wherein the first motion model represents a range of motion patterns and is configured to generate an alert in response to sensor data representing a deviation from the range of motion patterns.

13. A computer-implemented system for updating motion models using sensor data, the system comprising:
    a memory storing instructions; and
    at least one processor configured to execute the instructions to:
       receive sensor data from at least one motion sensor;
       generate training data based on at least one annotation associated with the sensor data and at least one data manipulation;
       receive at least one experiment parameter;
       perform a first experiment using the training data and the at least one experiment parameter to generate experiment results; and
       perform at least one of: updating or validating a first motion model based on the experiment results, wherein:
          performing the first experiment comprises applying the first motion model to the training data; and
          updating or validating the first motion model is based on at least one user input received from a management device.

14. The computer-implemented system of claim 13, wherein:
    the experiment results comprise a motion data pattern and at least one user-generated or model-generated annotation associated with the motion data pattern; and
    the at least one user input comprises an instruction to perform at least one of:
       shifting the at least one user-generated annotation or model-generated annotation;
       adding a new annotation to the experiment results; or
       deleting the at least one user-generated annotation or model-generated annotation.

15. The computer-implemented system of claim 1, wherein generating the training data comprises delineating horizon vectors associated with the sensor data based on the at least one annotation.

16. The computer-implemented system of claim 1, wherein the sensor data comprises at least two motion data streams captured by the at least one motion sensor during different time periods.

17. The computer-implemented system of claim 1, wherein the first motion model is at least one of a convolutional neural network or a recurrent neural network.

18. A method for updating motion models using sensor data, comprising:
    receiving sensor data from at least one motion sensor;
    generating training data based on at least one annotation associated with the sensor data and at least one data manipulation, the at least one data manipulation including at least one of:
       vertically scaling at least a portion of the sensor data;
       time scaling at least a portion of the sensor data;
       time shifting at least a portion of the sensor data;
       integrating white noise into at least a portion of the sensor data;
       applying random nonlinear skewing to at least a portion of the sensor data; or
       generating a plurality of data streams based on the sensor data, the data streams having differing smoothing intensities;
    receiving at least one experiment parameter;
    performing a first experiment using the training data and the at least one experiment parameter to generate experiment results; and
    performing at least one of: updating or validating a first motion model based on the experiment results.

19. A computer-implemented system for updating motion models using sensor data, the system comprising:
a memory storing instructions; and
at least one processor configured to execute the instructions to:
receive sensor data from at least one motion sensor;
generate training data based on at least one annotation associated with the sensor data and at least one data manipulation, the at least one data manipulation including at least one of:
vertically scaling at least a portion of the sensor data;
time scaling at least a portion of the sensor data;
time shifting at least a portion of the sensor data;
integrating white noise into at least a portion of the sensor data;
applying random nonlinear skewing to at least a portion of the sensor data; or
generating a plurality of data streams based on the sensor data, the data streams having differing smoothing intensities;
receive at least one experiment parameter;
perform a first experiment using the training data and the at least one experiment parameter to generate experiment results; and
perform at least one of: update or validate a first motion model based on the experiment results.

* * * * *